(No Model.) 2 Sheets—Sheet 1.
C. H. BROWN.
ADJUSTABLE BEARING FOR SPINDLES.

No. 511,318. Patented Dec. 19, 1893.

WITNESSES:
L. C. Leety
N. S. Dunn

INVENTOR
Charles H. Brown
BY
R. J. McCarty
ATTORNEY (No Model.) 2 Sheets—Sheet 2.

C. H. BROWN.
ADJUSTABLE BEARING FOR SPINDLES.

No. 511,318. Patented Dec. 19, 1893.

WITNESSES:
L. C. Leoty
H. J. Duan

INVENTOR
Charles H. Brown
BY
R. J. McCarty
ATTORNEY.

THE NATIONAL LITHOGRAPHING COMPANY,
WASHINGTON, D. C.

UNITED STATES PATENT OFFICE.

CHARLES H. BROWN, OF DAYTON, OHIO.

ADJUSTABLE BEARING FOR SPINDLES.

SPECIFICATION forming part of Letters Patent No. 511,318, dated December 19, 1893.

Application filed September 19, 1893. Serial No. 485,935. (No model.)

*To all whom it may concern:*

Be it known that I, CHARLES H. BROWN, of Dayton, county of Montgomery, State of Ohio, have invented a new and useful Improvement in Adjustable Bearings for Spindles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in bearings for the spindles of bicycles and other vehicles that are fitted with ball bearings.

The object of the invention is to provide means for adjusting said bearings to take up the wear incident thereto by reducing the area of the space for the balls.

To this end the improvements consist of means for adjusting the cones to the minutest degree necessary and locking them against the slightest movement, all of which will be hereinafter described in the specification and mentioned in the claims.

Figure 1:
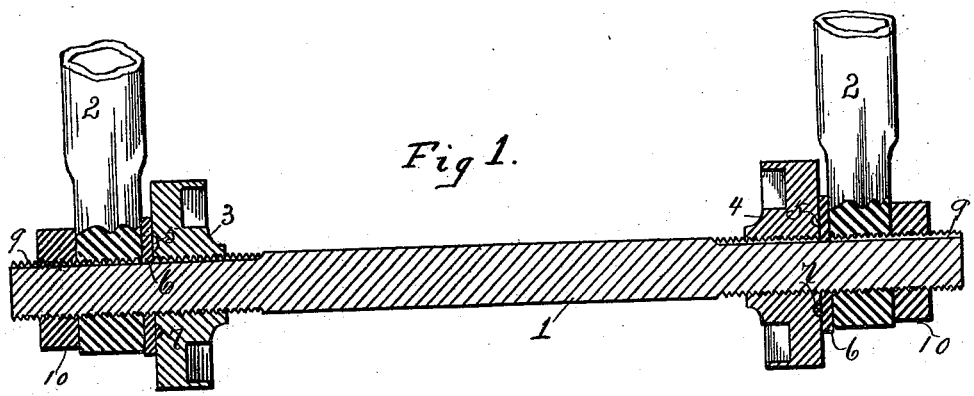
Figure 2:
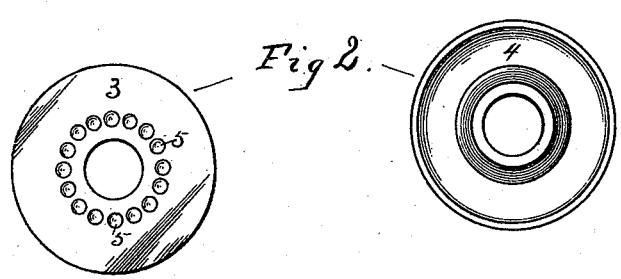
Figure 3:
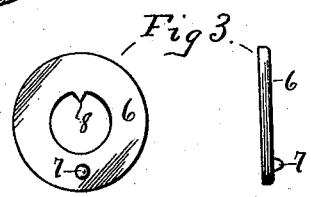
Figure 4:
Figure 4:
Figure 5:
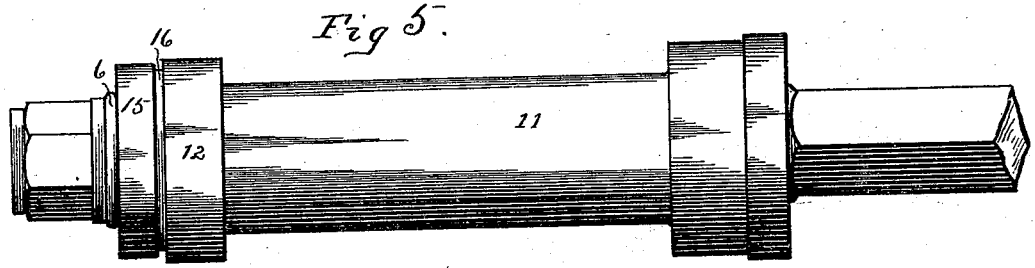
Figure 6:
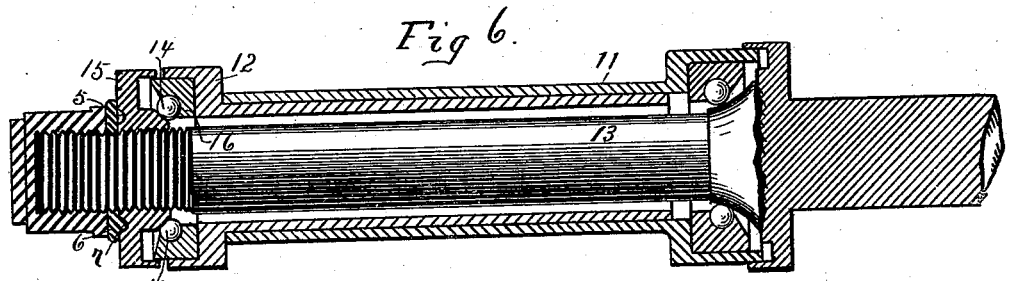
Figure 7:
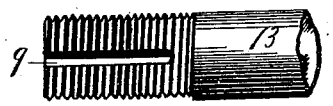
Figure 8:
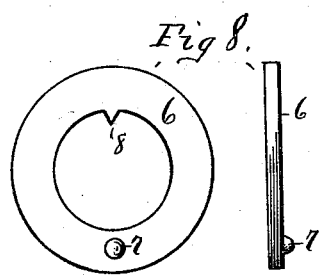
Figure 9:
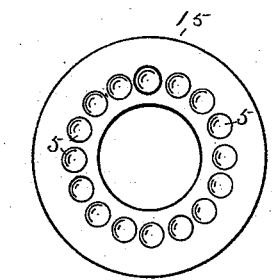

In the drawings herewith annexed and forming part of the specification, Figure 1 is a longitudinal section of a spindle of a bicycle wheel, with the cups removed, and part of the forks of the frame broken off, the parts of said forks surrounding the spindle appearing in section; Fig. 2 detached views of the inner and outer faces of the cone; Fig. 3 plan and edge views of the lock washer, detached; Fig. 4 end and longitudinal views of the spindle. Sheet 2 contains illustrations of my improvements applied to the spindle of a buggy, Fig. 5 showing the axle box and the spindle, part of the latter being broken away; Fig. 6 a longitudinal section of the box, part of the spindle appearing in section; Fig. 7 a view of the outer end of the spindle; Fig. 8 detached plan and edge views of the lock washer; Fig. 9 detached views of the inner and outer faces of the cone.

In the description similar reference characters will be used to indicate similar parts throughout the different views.

1 indicates a bicycle spindle and 2—2 are the forks attached thereto.

3 and 4 are the cones which form a partial bearing for the balls, the cups forming the inner bearings, and the balls do not appear; being well known features, their illustration has not been deemed essential to an understanding of the case. The cones 3 and 4 have on their face (their outer face) a series of cavities (5) encircling the axes of said cones.

6 is a washer having a small lug or teat 7 projecting laterally from a side thereof. 8 is a projection or tooth of V-shape which is stamped in the metal in the making of said washer; this tooth projects toward the center of the washer. In carrying out the function of said washer which function is to lock the cone against rotary movement, I provide the spindle on its screw-threaded portion with a groove 9 similar in shape to the tooth 8 on the washer and in which said tooth fits and may be moved; the teat 7 on said washer is designed to enter any of the cavities on the cones and thereby lock said cones and prevent their moving in either direction on the spindle. It will be understood that the shape of the tooth 8 and the groove 9 does not necessarily have to be of a V-shape to effect a locking of the washer with the cone; a U-shape or rectangular shape of these parts may answer the purpose. It is thought, however, that the forming of this groove in the shape of a (V) is preferable as it requires the cutting away of less metal from the spindle; therefore the strength of said spindle is not materially effected; jam nuts 10—10 secure the forks 2—2 against the washers and maintain them in rigid contact with the cones. A very minute adjustment is obtainable by the use of this device; in the drawings the cones 3 and 4 are shown to contain sixteen cavities which admit of said cones being adjusted as close as a three hundred and twentieth part of an inch, and fixed in such adjustment by a positive lock against movement in either direction. By increasing the number of cavities, or by increasing the circumferential circle formed by the cavities; or by increasing the number of screw-threads to the inch on the spindle, a still closer adjustment may be obtained.

On Sheet 2 of the drawings the device is shown applied to a buggy spindle; there is no variation in the construction of the parts embodying my invention, i. e., the cone and washer, in this application of them.

On Sheet 2, 11 12 indicate the box composed of two parts in which the buggy spindle 13 is inclosed; the balls 14—14 are inclosed between the bearing cone 15 and the cup 16 and said cone is provided with cavities (5) in which the teat 7 of the washer 6 fits; said washer is also provided with the tooth 8 which is designed to fit in the groove 9 of the spindle, all as is hereinbefore described.

It is understood from the foregoing description that in operation the V-shaped tooth on the washer prevents said washer from turning on the spindle while the teat on said washer prevents the cone from likewise turning.

Having fully described my invention, what I claim is—

1. The combination of a spindle having a longitudinal groove therein, a ball bearing cone provided with a series of cavities, a washer having a teat projecting from a side thereof designed to fit the cavities in said cone and a tooth near its center designed to engage with the groove in the spindle, and means for keeping said washer in contact with the cone, as herein specified.

2. The combination with a vehicle spindle; of a cone adapted to partially form the bearing for the balls said cone having in its outer face a series of cavities encircling the axis thereof, a washer provided with a V-shape tooth in its center designed to fit the groove in the spindle and a teat on its face designed to enter the cavities in said cone, whereby the cone may be locked in a fixed position, as herein described.

In testimony whereof I have hereunto set my hand this 12th day of September, 1893.

CHARLES H. BROWN.

Witnesses:
R. J. McCARTY,
H. T. DUNN.